United States Patent [19]

Chattha

[11] 4,178,322

[45] Dec. 11, 1979

[54] HIGH SOLIDS COATING COMPOSITION WITH ACRYLIC HYDROXYPHOSPHATE CATALYST-III

[75] Inventor: Mohinder S. Chattha, Livonia, Mich.

[73] Assignee: Ford Motor Company, Dearborn, Mich.

[21] Appl. No.: 973,329

[22] Filed: Dec. 26, 1978

[51] Int. Cl.$^2$ .............................................. C08L 63/00
[52] U.S. Cl. ............................. 525/188; 260/32.8 EP; 260/32.8 N; 260/33.6 EP; 260/33.6 UA; 260/39 M; 260/39 R; 525/512
[58] Field of Search .......................................... 260/834

[56] References Cited

U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/18 EP |
| 2,732,367 | 1/1956 | Shokal | 260/834 |
| 2,849,418 | 8/1958 | Fang | 260/836 |
| 3,133,838 | 5/1964 | Higgins | 260/837 R |
| 3,198,850 | 8/1965 | Levantin | 260/834 |
| 3,260,622 | 7/1966 | Suer | 526/13 |
| 3,524,903 | 8/1970 | Hargis | 260/837 R |
| 3,651,169 | 3/1972 | Davis | 260/834 |
| 3,936,416 | 2/1976 | Brady | 260/42.18 |
| 3,960,979 | 6/1976 | Khanna | 260/834 |
| 4,018,848 | 4/1977 | Khanna | 260/834 |
| 4,027,066 | 5/1977 | Victorius | 260/834 |
| 4,055,607 | 10/1977 | Sullivan | 260/834 |

Primary Examiner—Paul Lieberman
Attorney, Agent, or Firm—Roger L. May; Keith L. Zerschling

[57] ABSTRACT

A fast curing, high solids coating composition that is adapted for use as an automotive topcoat and which upon curing forms a hard, glossy, durable coating exhibiting excellent resistance to solvents and water. The coating composition contains greater than about 50 percent by weight of nonvolatile solids and, exclusive of pigments, solvents and other nonreactive components, consists essentially of:

(A) a polyepoxide resin having a number average molecular weight ($\overline{M}_n$) of between about 140 and about 3,000;

(B) a hydroxy functional acrylic organophosphate reactive catalyst;

(C) an amine-aldehyde crosslinking agent; and (D) optionally, a hydroxy functional additive.

The hydroxy functional acrylic organophosphate reactive catalyst is included in the composition in an amount sufficient to provide between about 0.9 and about 1.5 equivalents of acid functionality for each equivalent of epoxy functionality on the polyepoxide resin and the amino resin crosslinking agent is included in the composition in an amount sufficient to provide at least about 0.4 equivalents of nitrogen crosslinking functionality for each equivalent of hydroxy functionality included in the composition.

8 Claims, No Drawings

HIGH SOLIDS COATING COMPOSITION WITH ACRYLIC HYDROXYPHOSPHATE CATALYST-III

BACKGROUND OF THE INVENTION

This invention is related to a fast curing, high solids, thermosetting coating composition. More particularly, the invention relates to a polymeric, high solids, fast curing coating composition which is particularly adapted to provide an automotive topcoat and which demonstrates hardness, high gloss, outstanding durability and excellent resistance to solvents and water. Still more particularly, this invention relates to a fast curing, high solids, thermosetting coating composition adapted to be used as an automotive topcoat wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic falek during application and care of the coating. Flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The coating compositions of this invention combine the above discussed desired properties and low application viscosity with rapid cure so as to overcome deficiencies of previously proposed high solids materials and thereby achieve a high solids coating composition particularly adapted for automotive topcoats including metallic flake as a pigment.

SUMMARY OF THE INVENTION

The thermosetting coating composition of this invention contains greater than about 50 percent by weight of nonvolatile solids, preferably greater than about 60 percent by weight, and is capable of curing rapidly at a low temperature. The composition, exclusive of pigments, solvents and other nonreactive components, consists essentially of:

(A) a polyepoxide resin having a number average molecular weight ($\overline{M}_n$) of between about 140 and about 3,000;

(B) a hydroxy functional acrylic organophosphate reactive catalyst consisting essentially of the reaction product of:

(1) a hydroxy functional acrylic copolymer which (a) has a number average molecular weight (Mn) of between about 1500 and about 6000, (b) has a glass transition temperature of between about −25° C. and about 70° C., and (c) bears between about 2 and about 10 pendent hydroxyl groups per molecule; and (2) sufficient phosphorus pentoxide to produce a reaction product having an acid equivalent weight of between about 500 and about 3000;

(C) an amine aldehyde crosslinking agent; and (D) up to about 45 weight percent based on the total weight of (A), (B), (C) and (D) of a hydroxy functional resin having a number average molecular weight ($\overline{M}_n$) of between about 150 and about 6000.

The hydroxy functional acrylic organophosphate reactive catalyst is included in the composition in an amount sufficient to provide between about 0.9 and about 1.5 equivalents, preferably between about 1.0 and about 1.2 equivalents, of acid functionality for each equivalent of epoxy functionality on the polyepoxide resin. The amine aldehyde crosslinking agent is included in the composition in an amount sufficient to provide at least about 0.4 equivalents, preferably between about 0.6 and about 2.1 equivalents, of nitrogen crosslinking functionality for each equivalent of hydroxy functionality included in the composition either as (i) an organic hydroxyl group on said hydroxy functional acrylic organophosphate reactive catalyst, (ii) a hydroxyl group on said hydroxy functional resin, or (iii) as a result of esterification of the epoxy functionality of said polyepoxide resin during cure of the composition. In addition, the high solids coating composition of the invention may include additives such as catalysts, antioxidants, U.V. absorbers, flow control or wetting agents, antistatic agents, pigments, plasticizers, solvents, etc.

PRIOR ART

U.S. Pat. Nos. 3,960,979 and 4,018,848 to Khanna teach high solids coating compositions adapted for use as a can coating material. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexiblizing polyol.

The compositions of Khanna have the advantage of quick reaction and low application viscosity, but lack durability, and, therefore, do not weather well. This is, in part, because of the presence of ether linkages in the aromatic epoxides. As such, the compositions of Khanna are not desirable for use as automotive topcoats. The Khanna patents describe the compositions as a low cure system. However, when considering the specific teachings of the patents one finds that the composition includes an excess of epoxide resin, apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give still further ether linkages. These ether linkages so obtained have a further deleterious effect on durability and make the materials particularly unsuitable for use as an automotive topcoat. Also, the necessary high bake temperatures to achieve the utilization of this excess epoxy makes the composition undesirable from an energy point of view. Still further, because the epoxy/catalyst reaction occurs in early stages of the cure, thus "killing off" the catalyst, the melamine-hydroxy curing reaction must proceed substantially without benefit of catalysis. The curing reaction thus proceeds slowly and requires the higher temperatures of the Khanna examples.

DETAILED DESCRIPTION OF THE INVENTION

The high solids coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., between about 75° C. and about 150° C., preferably between about 110° C. and about 130° C. The desirable characteristics of the coating compositions of this invention result from the carefully controlled admixture of the particular components, including the hydroxy functional acrylic organophosphate reactive catalyst, to achieve substantially complete utilization of reactant functionality and a resultant highly crosslinked coating in a fast and efficient manner.

Each of the components of the high solids coating compositions, the amounts of each of the components required to achieve the desired results of the invention and a method for applying the composition are described hereinafter in greater detail.

Polyepoxide Resin

A principal material in the high solids coating compositions of this invention is a polyepoxide resin having a number average molecular weight ($\overline{M}_n$) of between about 140 and about 3,000, preferably between about 300 and about 2,000. The term polyepoxide resin as used herein means epoxide compounds or polymers containing 2 or more epoxide groups.

Polyepoxide resins useful in the invention are preferably selected from aliphatic, cycloaliphatic and aromatic polyepoxides falling within the stated molecular weight range. Such polyepoxides are well known compositions and any of these may be employed in the coatings of the invention. Among the many suitable types of polyepoxides are those disclosed by U.S. Pat. Nos. 3,404,018; 2,528,359; 2,528,360; 3,198,850; 3,960,979; and 4,018,848.

U.S. Pat. No. 3,404,018 discloses several particularly suitable types of polyepoxides including: (1) polyglycidyl ethers of polyhydric alcohols and polyhydric phenols; (2) epoxidized esters of polyethylenically unsaturated monocarboxylic acids; (3) glycidyl esters of polybasic acids; (4) epoxidized esters of unsaturated monohydric alcohols and polycarboxylic acids; and (5) epoxidized polymers and copolymers of diolefins. Many polyepoxides other than those recited in this or other referenced patents will be apparent to those skilled in the art.

Organophosphate Ester

A second essential component of the high solids coatings of this invention is a hydroxy functional acrylic organophosphate reactive catalyst consisting essentially of the reaction product of:

(1) a hydroxy functional acrylic copolymer which (a) has a number average molecular weight ($\overline{M}n$) of between about 1500 and about 6000, (b) has a glass transition temperature of between about −25° C. and about 70° C., preferably between about −10° C. and about 50° C., and (c) bears between about 2 and about 10 pendent hydroxyl groups per molecule; and (2) sufficient phosphorus pentoxide to produce a reaction product having an acid equivalent weight of between about 500 and about 3000, preferably between about 700 and about 1500.

The reaction between the hydroxy bearing acrylic copolymer and the phosphorus pentoxide is generally carried out by adding phosphorus pentoxide portionwise to the hydroxy bearing acrylic copolymer, preferably an excess of the copolymer, in a liquid state or in solution in a suitable solvent. Suitable solvents include, but are not limited to, butyl acetate, methyl ethyl ketone, methyl amyl ketone, toluene, xylene, etc.

The hydroxy bearing acrylic copolymers used in preparing the reactive catalyst, as noted above, have a number average molecular weight of between about 1500 and about 6000 and a glass transition temperature of between about −25° C. and about 70° C., preferably between about −10° C. and about 50° C. These hydroxy functional copolymers are prepared by copolymerizing various monoethylenically unsaturated monomers, including at least about fifty (50) weight percent of alpha-beta olefinically unsaturated acrylate monomers. Preferred acrylate monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc.

Hyproxy functional ethylenically unsaturated monomers are included in the reaction mixture of monomers used in preparing the copolymer in sufficient amount that the copolymer molecules bear between about 2 and about 10 hydroxyl groups. The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxy-propyl acrylate; 2,3 dihydroxypropyl acrylate; 2-hydroxy-butyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2-hydroxypropyl methacrylate; 3-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxy bearing monomers including those listed above could be employed, the preferred hydroxy functional monomers for use in the hydroxy functional copolymer used to prepare the hydroxy functional acrylic organophosphate reactive catalyst are $C_5$–$C_7$ hydroxy alkyl methacrylates, i.e., esters of $C_2$–$C_3$ dihydric alcohols and acrylic or methacrylic acids.

Other monoethylenically unsaturated monomers which may be used in preparing these copolymers are monovinyl hydrocarbons and certain modifying monomers. These monomers may comprise the remainder of the monomers making up said copolymer, other than said acrylate monomers and said hydroxy functional monomers; provided, however, that the modifying monomers should constitute only up to about 10 weight percent of the monomers in the copolymer. Exemplary of suitable monovinyl hydrocarbons are those containing 8 to 12 carbon atoms, such as styrene, alpha-methylstyrene, vinyl toluene, t-butylstyrene and chlorostyrene. Modifying monomers may include vinylchloride, acrylonitrile, methacrylonitrile and vinylacetate.

In preparing the hydroxy functional copolymer, the various monomers may be mixed and reacted by conventional free radical initiated polymerization in such proportions as to obtain the copolymer desired. A large number of free radical initiators are known to the art and are suitable for the purpose. These include: benzoyl peroxide; acetylcyclohexyl sulfonyl peroxide; diisobutyryl peroxide; di-(2-ethylhexylperoxypivalate; decanoyl peroxide; azobis (2-methylpropionitrile), etc. The polymerization is preferably carried out in solution using a solvent in which the hydroxy functional copolymer is soluble. Included among the suitable solvents are toluene, xylene, dioxane, butanone, etc. If the hydroxy functional copolymer is prepared in solution, the solid copolymer can be precipitated by pouring the solution at a slow rate into a nonsolvent for the copolymer, such as hexane, octane, or water under suitable agitation conditions. The copolymers can also be prepared by emulsion polymerization, suspension polymerization, bulk polymerization, or combinations thereof, or still other suitable methods. In these methods of preparing copolymers, chain transfer agents may be required to control the molecular weight.

A preferred temperature for carrying out the reaction between the aforementioned hydroxy functional acrylic copolymer and the phosphorus pentoxide is between about 50° C. and about 60° C. Due to the multiple hydroxy functionality of the hydroxy functional acrylic copolymer, various polymeric acid phosphates and cyclophosphates are probably generated during the synthesis. All of these organophosphate derivatives so produced serve as a reactive catalysts and, therefore, the entire reaction product mixture may be employed as the reactive catalyst. In those cases where an excess of the hydroxy functional acrylic copolymer is employed, that excess may serve as all or part of the optional hydroxy functional additive of the composition as hereinafter described.

The hydroxy functional acrylic organophosphate reactive catalyst of the high solids coating compositions of the invention allows the compositions to cure rapidly at a low temperature. The acid functionality of the organophosphate esters present in the reactive catalyst reacts with the epoxy functionality of the polyepoxide resin to form an ester and a hydroxyl group. This hydroxyl group, as well as the organic hydroxyl groups on the hydroxy functional acrylic organophosphate reactive catalyst, and any optional hydroxyl groups included in the composition in the form of hydroxy functional additive, including excess hydroxy functional acrylic copolymer present from the synthesis of the hydroxy functional acrylic organophosphate reactive catalyst, crosslinks with the amino resin crosslinking agent. It is crittical to achieving the desired results of the high solids coating compositions of this invention, i.e., in making them suitable for use as automotive topcoats, that the amount of the hydroxy functional acrylic organophosphate reactive catalyst be sufficient to convert substantially all of the epoxy functionality on polyepoxide resin to the desired hydroxy functionality by esterification reaction. Therefore, the hydroxy functional acrylic organophosphate reactive catalyst is included in the composition in an amount sufficient to provide between about 0.9 and about 1.5 equivalents, preferably between about 1.0 and about 1.2 equivalents, of acid functionality for each equivalent of epoxy functionality on the polyepoxide resin. As will be noted from the equivalent amounts of epoxy and reactive catalyst acid functionality stated above, the acid functionality need not be in stoichiometric amounts to the epoxy functionality. This because of the fact that during curing of the high solids coating composition, residual water present in the composition hydrolyzes some of the esterified product back to acid and this hydrolyzed product then, in turn, reacts with additional epoxy functionality.

Amino Crosslinking Agent

A third essential component of the high solids paint compositions of this invention is an amine-aldehyde crosslinking agent. Amino crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amino crosslinking agents useful in this invention are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100 percent nonvolatile content as measured by the foil method at 45° C. for 45 minutes. For the purposes of the invention it should be recognized that it is important not to introduce extraneous diluents that would lower the final solids content of the coating.

Particularly preferred crosslinking agents are those sold by American Cyanamid under the trademark "Cymel". In particular, Cymel 301, Cymel 303 and Cymel 1156, which are alkylated melamine-formaldehyde resins, are useful in the compositions of the invention by reacting with hydroxy functionality included in the composition (i) as an organic hydroxyl group on the hydroxy functional acrylic organophosphate reactive catalyst, (ii) as hydroxy functionality on the optional hydroxy functional additive, or (iii) as a result of esterification of the pendent epoxy functionality on the polyepoxide resin.

In order to achieve the outstanding properties which make these coating compositions particularly useful as automotive topcoat materials, it is essential that the amount of amino crosslinking agent be sufficient to substantially completely crosslink the hydroxy functionality in the coating composition. Therefore, the amino resin crosslinking agent should be included in the composition in an amount sufficient to provide at least about 0.4 equivalents, preferably between about 0.6 and about 2.1 equivalents, of nitrogen crosslinking functionality for each equivalent of hydroxy functionality included in the composition.

Optional Hydroxy Functional Additive

Additional hydroxy functionality other than that achieved by esterification of pendant epoxy functionality of the polyepoxide resin or by the hydroxy functional acrylic organophosphate reactive catalyst may be achieved by adding a hydroxy functional additive in amounts up to about 45 weight percent based on the total of the three above discussed components and the hydroxy functional additive itself. Such a material serves to provide additional hydroxy functionality so as to provide a more intimate crosslinked structure in the final cured product. The hydroxy functional additives useful in the composition are preferably selected from various polyols have a number average molecular weight ($M_n$) of between about 150 and about 6,000, preferably between about 400 and about 2500. As used herein the term polyol means a compound having two or more hydroxyl groups.

The polyols useful for the invention preferably are selected from the group consisting of: (i) hydroxy functional polyesters; (ii) hydroxy functional polyethers; (iii) hydroxy functional oligoesters, (iv) monomeric polyols, (v) hydroxy functional copolymers produced by free radical polymerization of monoethylenically unsaturated monomers, one or more of which bears hydroxy functionality and which is included in the copolymer in an amount ranging from about 2.5 to about 30 weight percent of the copolymer and (vi) mixtures of (i)-(v).

The hydroxy functional polyesters useful in the invention are preferably fully saturated products prepared from aliphatic dibasic acids containing 2-20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 150 to about 3000 and the hydroxyl number ranges from about 30 to about 230. The hydroxyl number is defined as the number of milligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a phydroxy functional monocarboxylic acid with either a mono- or polyepoxide.

The oligoester prepared by reacting a di-carboxylic acid with an alkylene oxide is a low molecular weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred dicarboxylic acids are $C_6$-$C_{12}$ aliphatic acids such as adipic acid, azelaic acid sebacic acid or dodecane dicarboxylic acid. Mixtures of these acids or mixtures of the aliphatic dicarboxylic acids with aromatic dicarboxylic acids also yield suitable hydroxy functional oligoesters.

The preparation of oligoesters from monocarboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be the same hydroxy functional acrylic copolymer used to prepare the hydroxy functional acrylic organophosphate reactive catalyst.

Other Materials

In addition to the above discussed components, other materials may be included in the high solids coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methyethyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the polyepoxide resin of the coating composition is prepared, may be employed as the solvent for the coating composition, thus eliminating the need for drying the polyepoxide resin after preparation if such is desired. As mentioned above, the nonvolatile solids content of the high solids coating composition is at least 50 percent and preferably 60 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coating on surfaces, particularly metal surfaces. These surface modifiers are exemplified by acrylic polymers containing 0.1–10 percent by weight of a copolymerized monoethylenically unsaturated carboxylic acids such as methacrylic acid, acrylic acid or itaconic acid, cellulose acetate butyrate, silicon oils or mixtures thereof. Of course, the choice of surface modifier or wetting agent is dependent upon the type of surface to be coated and selection of the same is clearly within the skill of the artisan.

The high solids coating composition of the invention also may include pigments. As noted above, the high solids compositions of this invention are particularly useful when the coating composition includes metallic flake as a pigment. The rapid set and curing of the composition eliminates problems associated with redistribution of the metallic flake in the composition. The amount of pigment in the high solids coating composition may vary, but preferably is between 3 and about 45 weight percent based on the total weight of the paint composition. If the pigment is metallic flake, the amount preferably ranges from about 1 to about 7 weight percent.

Application Techniques

The high solids coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

A hydroxy acrylic copolymer is prepared from the following monomers:

|  | Wt/Grams | Wt. % |
|---|---|---|
| Hydroxyethyl acrylate | 400 | 20 |
| Methylmethacrylate | 400 | 20 |
| Styrene | 200 | 10 |
| Butyl methacrylate | 1000 | 50 |

One hundred (100) grams tert-butyl perbenzoate is added to the above monomer mixture and the resulting solution added dropwise over a period of two hours to 1600 grams of refluxing (145°) methyl amyl ketone (under nitrogen). The heating and stirring is continued for half an hour after the addition is complete and then five (5) grams of tert-butyl perbenzoate are added portionwise to the reaction mixture. The reaction mixture is refluxed for an additional ninety minutes and then allowed to cool to room temperature. The molecular weight is determined by Gel Permeation Chromatography: $\overline{M}_n = 2540$, $\overline{M}_w/\overline{M}_n = 1.94$ Calculated $T_g = 27°$ C.

Theoretical solids = 60%
Determined solids = 59.2%
Viscosity, #4 Ford Cup = 44 Sec.
Hydroxy equivalent weight = 980

Five hundred (500) grams of the above polymer solution are dissolved in 100 ml n-butyl acetate and the solution is heated to 60° C. Powdered $P_2O_5$ is added portionwise with continuous stirring and maintaining the temperature at 60° C. Small test portions of the reaction mixture are titrated with sodium hydroxide solution and the addition of $P_2O_5$ is continued until the acid equivalent weight reached 1564.

One hundred (100) parts of the above prepared hydroxy functional acrylic organophosphate reactive catalyst are mixed with 20 parts of Cymel 301, 13 parts of aliphatic epoxy Araldite CY-178, 7 parts of aluminum flakes (65% in naphtha) and 16 parts of n-butyl acetate. The resulting formulation is applied by spraying in three coats to primed steel panels which are baked at 130° C. for 20 minutes to obtain silver metallic coating with excellent hardness, adhesion and solvent (xylene and methyl ethyl ketone) resistance.

EXAMPLE 2

Fifty (50) parts of the reactive catalyst reaction product mixture from Example 1, are mixed with eleven parts of Cymel 301, 5 parts of Epon 828 (Shell Chem. Co.) and 10 parts of butyl acetate. The resulting formulation is applied by spraying to primed steel panels which are baked at 130° C./20 minutes to obtain coatings with excellent gloss, hardness, adhesion and solvent (xylene and methyl ethyl ketone) resistance.

EXAMPLE 3

Fifty (50) parts of Phthalo Blue pigment are mixed with 500 parts of Acryloid OL-42 and 44 parts of n-butyl acetate and this mixture is ground in a pebble mill for 24 hours.

Twenty-five (25) parts of the above mill base are mixed with 28 parts of the reactive catalyst reaction product mixture from Example 1, 3 parts Epon 828, 27 parts of Cymel 301, 4.8 parts of aluminum flakes (65% in naphtha) and 9 parts of n-butyl acetate. The resulting formulation is sprayed on primed panels in three coats with one minute flash times between coats. After five minutes final flash, the panels are baked at 130° C. for 20 minutes to obtain blue metallic coatings with excellent hardness, adhesion and solvent resistance.

EXAMPLE 4

An acrylic copolymer is prepared from the following monomers:

|  | Parts by Weight |
|---|---|
| Butyl methacrylate | 26 |
| Ethylhexyl acrylate | 20 |
| Hydroxyethyl acrylate | 30 |
| Styrene | 24 |

The preparation is carried out in the same way as outlined in Example 1(b) by using cellusolve acetate as the solvent and tert-butyl peroctoate (5% of monomers) as initiator to obtain a 70% solution of the polymer. The calculated Tg is $-7°$ C. and the molecular weight from Gel Permeation Chromatography is $\overline{M}_n = 3070$ and $\overline{M}w/\overline{M}_n = 2.2$.

Four hundred (400) grams of this polymer solution are dissolved in 100 grams of cellusolve acetate and the solution is heated to 50° C. Thirty-five (35) grams of phosphorus pentoxide are added portionwise (5 hours) with continuous stirring and maintaining the temperature at 60° C. After the addition is complete, the reaction mixture is heated for one hour at 60° C. and then it is filtered through a coarse filtering paper. From sodium hydroxide titration, the acid equivalent weight is found to be 786. Gel Permeation Chromatography shows its molecular weight ($\overline{M}n$) to be 3102 (d=2.5).

Sixty (60) parts of the above prepared hydroxy functional acrylic organophosphate reactive catalyst are mixed with 23 parts of Cymel 301, 15 parts of Araldite CY-178 and 18 parts of n-butyl acetate. This mixture is well shaken and spray applied to primed steel test panels. The panels are baked at 130° C. for 25 minutes to obtain a coating with excellent hardness, adhesion and solvent (xylene and methyl ethyl ketone) resistance.

EXAMPLE 5

In the formulation described in Example 2, twelve (12) parts of Cymel 1156 are substituted for Cymel 301 used therein. The resulting composition is applied by spraying to primed steel panels which are baked at 135° C./20 minutes to coatings with excellent gloss, hardness, adhesion and solvent resistance.

EXAMPLE 6

In the formulation described in Example 4, 33 parts of benzoguanamine resin (Cymel 1123) are substituted for Cymel 301 used therein. The resulting formulation is applied by spraying to primed steel panels which are baked at 140° C. for 20 minutes to obtain coating with excellent physical properties.

EXAMPLE 7

In the composition described in Example 2, 16 parts of glycoluril resin (Cymel 1170) are substituted for Cymel 301 used therein. The resulting formulation is applied by spraying to primed steel panels which are baked at 140° C. for 20 minutes to obtain coatings with excellent hardness, adhesion and solvent (xylene and methyl ethyl ketone) resistance.

EXAMPLE 8

Three hundred fifty (350) parts of TiO$_2$ are mixed with 350 parts of Acryloid OL-42 (Rohm and Haas Chem. Co.) and 25 parts of n-butyl acetate. The above mixture is taken up in a porcelain bottle containing porcelain beads and put on a roller mill for 16 hours. Forty (40) parts of this mill base are mixed with 5 parts of hydroxy ester Desmophen KL5-2330 (Rohm and Haas Chem. Co.), 3 parts of Araldite CY-178, 12 parts of Cymel 301, 10.5 parts of the reactive catalyst reaction product from Example 4 and 15 parts of n-butyl acetate. The resulting formulation is applied by spraying to primed steel panels which are baked at 140° C. for 20 minutes to obtain coatings with excellent physical properties.

EXAMPLE 9

Three parts of Cymel 301 and 3.5 parts of caprolactone based diol, PCP-0200 (Union Carbide) are added to the composition described in Example 2. The resulting formulation is applied by spraying to primed steel panels which are baked at 135° C. for 20 minutes to obtain coatings with excellent gloss, hardness, adhesion and solvent (xylene and methyl ethyl ketone) resistance.

EXAMPLE 10

Five parts of hydroxy polymer from Example 4, 3.5 parts of Cymel 301 and 2.4 parts of reactive diluent RG-82 (Eastman-Kodak) are added to the composition described in Example 8. The resulting formulation is applied by spraying to primed steel panels which are baked at 140° C. for 20 minutes to obtain coatings with excellent physical properties.

EXAMPLE 11

Seven parts of 1,4-butanediol diglycidyl ether are substituted for Araldite CY-178 in Example 4 and the resulting formulation is applied by spraying to primed steel panels. The panels are baked at 135° C. for 20 minutes to obtain coatings with excellent hardness, adhesion, gloss and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

I claim:

1. A thermosetting coating composition adapted for low temperature bake applications which contains greater than about 50% by weight of nonvolatile solids, and which, exclusive of pigments, solvents and other nonreactive components, consists essentially of:
   (A) a polyepoxide resin having a number average molecular weight ($\overline{M}_n$) of between about 140 and about 3,000;
   (B) a hydroxy functional acrylic organophosphate reactive catalyst consisting essentially of the reaction product of:
   (1) a hydroxy functional acrylic copolymer which (a) has a number average molecular weight ($\overline{M}n$) of between about 1500 and about 6000, (b) has a glass transition temperature of between about −25° C. and about 70° C., and (c) bears between about 2 and about 10 pendant hydroxy groups per molecule; and
   (2) sufficient phosphorus pentoxide to produce a reaction product having an acid equivalent weight of between about 500 and about 3000;
   (C) an amine aldehyde crosslinking agent; and
   (D) up to about 45 weight percent based on the total weight of (A), (B), (C) and (D) of a hydroxy functional additive having a number average molecular weight ($\overline{M}_n$) of between about 150 and about 6000, said hydroxy functional acrylic organophosphate reactive catalyst being included in said composition in an amount sufficient to provide between about 0.9 and about 1.5 equivalents of acid functionality for each equivalent of epoxy functionality on said polyepoxide resin, and said amine aldehyde crosslinking agent being included in said composition in an amount sufficient to provide at least about 0.4 equivalents of nitrogen crosslinking functionality for each equivalent of hydroxy functionality included in ssaid composition either as (i) an organic hydroxyl group on said hydroxy functional acrylic organophosphate reactive catalyst, (ii) a hydroxyl group on said hydroxy functional additive, or (iii) as a result of esterification of said epoxy functionality of said polyepoxide resin during cure of said coating composition.

2. A composition in accordance with claim 1 wherein said polyepoxide resin is selected from the group consisting of aliphatic, cycloaliphatic and aromatic polyepoxides having a number average molecular weight of between about 300 and about 2,000.

3. A composition in accordance with claim 1 wherein said hydroxy functional acrylic copolymer used to prepare said hydroxy functional acrylic organophosphate reactive catalyst is a copolymer prepared from at least about 50 weight percent of acrylate monomers and sufficient hydroxy functional monoethylenically unsaaturated monomers to provide the desired hydroxy functionality.

4. A composition in accordance with claim 3 wherein said copolymer has a glass transition temperature of between about $-10°$ C. and about $50°$ C. and is prepared from at least 50 weight percent of acrylate monomers, sufficient hydroxy functional monoethylenically unsaturated monomers to provide the desired hydroxy functionality, and a remainder of monomers selected from $C_8$–$C_{12}$ monovinyl hydrocarbons and vinyl modifying monomers, said vinyl modifying monomers comprising less than 10 weight percent of the monomers in said copolymer.

5. A composition in accordance with claim 1, wherein said hydroxy functional acrylic organophosphate reactive catalyst is the reaction product of an excess of said hydroxy functional acrylic copolymer and phosphorus pentoxide.

6. A composition in accordance with claim 1 wherein said amine-aldehyde crosslinking agent selected from the group consisting of condensation products of formaldehyde with melamine, substituted melamine, urea, benzoguanamine, and substituted benzoguanamine, and mixtures of said condensation products, and is included in an amount sufficient to provide between about 0.6 and about 2.1 equivalents of nitrogen crosslinking of functionality per equivalent of hydroxy functionality.

7. A composition in accordance with claim 1 wherein said hydroxy functional additive is selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 30 weight percent of said copolymer, and (vi) mixtures of (i)–(v).

8. A composition in accordance with claim 1 wherein said hydroxy functional acrylic organophosphate reactive catalyst is included in said composition in an amount sufficient to provide between about 1.0 and about 1.2 equivalents of acid functionality for each equivalent of epoxy functionality on said polyepoxide resin.

* * * * *